United States Patent [19]

Barber

[11] Patent Number: 5,175,411
[45] Date of Patent: Dec. 29, 1992

[54] METHOD FOR WELDING STRUCTURAL GAPS

[75] Inventor: Ralph R. Barber, Waxhaw, N.C.

[73] Assignee: Westinghouse Electric Corp., Pittsburgh, Pa.

[21] Appl. No.: 749,242

[22] Filed: Aug. 23, 1991

[51] Int. Cl.[5] .............................................. B23K 9/00
[52] U.S. Cl. .................................. 219/137 R; 219/160
[58] Field of Search ........................... 219/137 R, 160

[56] References Cited

U.S. PATENT DOCUMENTS

| | | | |
|---|---|---|---|
| 2,637,521 | 5/1953 | Constantine et al. | 219/137 R |
| 2,847,958 | 8/1958 | Norton, Jr. et al. | 219/160 |
| 3,365,566 | 1/1968 | Kuder | 219/160 |
| 4,219,717 | 8/1980 | Kuhnen | 219/137 R |
| 4,723,064 | 2/1988 | Bothe, II | 219/160 |

Primary Examiner—Clifford C. Shaw

[57] ABSTRACT

A method for welding a structure containing a gap which is exposed on either side of the gap is disclosed. The method is ideally suited for welding the gap which exists between the inner cylinder and nozzle chamber of a steam turbine during manufacture and repair. The method is accomplished by applying a refractory material into one side of the gap, preferably with the aid of gravity while the structure is inverted. When the refractory material is in place, the gap is welded. Upon completion of the welding procedure, the refractory material is preferably removed. In accordance with the present invention, a substantially uniform weld can be made upon a gap which is exposed on either side without the need for a controlled precision initial root weld.

18 Claims, 2 Drawing Sheets

METHOD FOR WELDING STRUCTURAL GAPS

BACKGROUND OF THE INVENTION

1. Field of the Invention

The present invention relates to a method for welding. More specifically, the invention relates to a method for welding a structure containing a gap which is exposed on either side, and in particular to weld the area between the nozzle chamber and the inner cylinder in a steam turbine.

2. Description of the Prior Art

The welding of a gap in a structure which is practically inaccessible from one side, from a welding and finishing standpoint, presents peculiar welding problems. If the weld must be made with a uniformly even finish, a very controlled welding procedure must be followed to regulate the heat input to the weld area. This controlled welding process is necessary in order to guard against heating the base metal to a point where it may deform and cause an uneven weld finish. If the heat input is reduced too far, an incomplete weld may result. The welding procedure is complicated further by the different types of alloys which are to be welded. Different welding parameters for heat input are required in order to induce the proper amount of energy to weld the components without introducing too little or too much heat input.

The description of such a welding condition is best explained by making reference to an example. During the manufacture and repair of high pressure steam turbine inner cylinders, a weld is sometimes used to seal the gap between the nozzle chamber and the inner cylinder and to join these two components together. This weld is exceedingly difficult due to the unique geometries of these two turbine components. The point at which the nozzle chamber and the inner cylinder meet defines a narrow gap approximately 0.025 cm (0.01 in.) wide. Below this gap is a lower cavity defined by the walls of the inner cylinder and the nozzle chamber which is approximately 1.6 cm (0.6 in.) wide. This cavity is too narrow to allow for a proper welding procedure from the direction coming from the inner cylinder towards the outer cylinder.

The welding processes of the prior art employed several independent techniques to weld the inner cylinder and the nozzle chamber together without creating a surface or internal defect in the weld. The primary difference in these techniques was the method used to form the critical initial part of the weld joint known as the "root" pass. This initial layer, the "root pass", is primarily a fusion of the inner cylinder and nozzle chamber at the previously described narrow gap, by application of sufficient heat to melt the two materials together.

Several variations of parameters have been tried in an effort to reliably achieve a defect-free "root" pass, and simultaneously provide a lower surface substantially level and flush with the adjacent lower cavity. If too little heat is applied, incomplete fusion will result, and cause a local stress concentration at the discontinuity. If too much heat is applied, the hot "root" pass material has insufficient surface tension to prevent the fused area from sagging, dripping, or "burning through" under the force of gravity, and results in an irregular surface at the lower cavity, which again introduces unwanted stress concentration.

Many of the techniques used previously in an effort to provide a superior quality "root" pass involved variations of the pre-weld joint geometry near the narrow gap. Some examples are: (1) addition of vertical lips or rims along either side of the gap above the root area to provide extra metal that would flow into the narrow gap area during fusion of the joint; (2) removal of material in the shape of an inverted "V" centered on the gap at the lower cavity, so that the metal flowing into the joint during fusion would not sag beyond the lower cavity surface; (3) combination of these two techniques; and (4) increasing the thickness of the "root" area (the distance between the upper and lower cavities joined by the narrow gap) to permit higher "root" pass heat input for better fusion, while minimizing the tendency for sagging.

Other techniques involved variations in the "root" pass welding process parameters, including changes in the amount of heat input and speed at which the "root" area was fused; addition of extra filler metal to the "root" pass; and various combinations of preheating the nozzle chamber and inner cylinder halves of the joint. Each of these methods provided a limited number of successful applications until a poor "root" pass quality incident necessitated that another variation be developed.

Once the critical "root" pass weld has been completed, several layers of weld are usually added at reduced levels of heat input to avoid remelting the initial "root" layer and thereby losing the desired quality achieved thus far. Some defects have been introduced into the welded joint at this stage, because the desire to avoid remelting the initial layer has resulted in insufficient heat input to provide complete fusion of these subsequent layers to the "root" layer, or to each other. After application of these intermediate weld passes, any of several welding processes with higher heat input, higher rates of deposition, and less critical process control can be used to fill the remaining volume of the weld.

A need therefore exists in the welding art in general, and particularly in the steam turbine manufacturing and repairing field, for a process to weld a gap in a structure which contains the peculiar geometric configuration described above.

SUMMARY OF THE INVENTION

The present invention broadly provides a method for welding a gap in a structure which is exposed on both sides of the gap. A refractory material is applied into one side of the structure adjacent to the gap. A weld is then made on the opposite side of the structure upon the gap. After the weld is complete, the refractory material is removed from the structure. The resulting weld is characterized by having a uniform, substantially planar weld surface where the refractory material was located. Therefore, that surface does not require machine finishing to ensure a relatively smooth surface.

The present invention also provides a method for welding the nozzle chamber together to the inner cylinder within a steam turbine. During the assembly or repair of a steam turbine, the nozzle chamber and the inner cylinder are separated by a gap at their interfaces. Above this gap is an upper cavity defined by the upper surface of both the nozzle chamber and the inner cylinder. Below this gap is a lower cavity defined by both the lower surface of the nozzle chamber and the inner cylinder.

The present method provides for the welding of the inner cylinder with the nozzle chamber. The nozzle chamber and the inner cylinder are fixed in a stationary position relative to one another. Next, a refractory material is applied into the lower cavity and adjacent to the gap. The nozzle chamber and inner cylinder interfaces are then welded together by performing a welding operation upon the gap. The refractory material is then removed from the lower cavity. The method provides a uniform substantially planar lower weld surface adjacent to where the refractory material was located.

In accordance with the present invention, preferred additional steps may be employed during the welding process. The turbine structure may be inverted before the application of the refractory material so that the refractory material flows into place with the aid of gravity. The turbine structure is then returned to its normal position for the application of the welding operation. The welding operation is preferably performed by employing a GTAW (gas tungsten arc weld) welding procedure. The welding procedure may be conducted in two stages. In the first stage, a weld would be performed upon the gap in order to effect a bonding of the inner cylinder and nozzle chamber interfaces. In the second stage, another welding operation is performed adjacent to the first weld in order to fill a portion of the upper cavity with welding material.

DESCRIPTION OF THE PREFERRED EMBODIMENT

The present invention relates to a novel method of welding a gap within a structure which is disposed in such a geometry that the performance of a welding operation from one surface is impractical or where the area to be welded has a void space beneath it in which the metal to be welded may sag or fall during the welding process.

In a practical application of the present invention, and in order to properly detail the specifics of the inventive method, the invention will be disclosed in the context of a weld to be made between a nozzle chamber and an inner cylinder found within a steam turbine. Although ideally suited for such a welding condition, the method of the present invention is not limited to such an application and applications which are obvious to those skilled in the welding art are also contemplated as being part of this invention.

Figure 1:
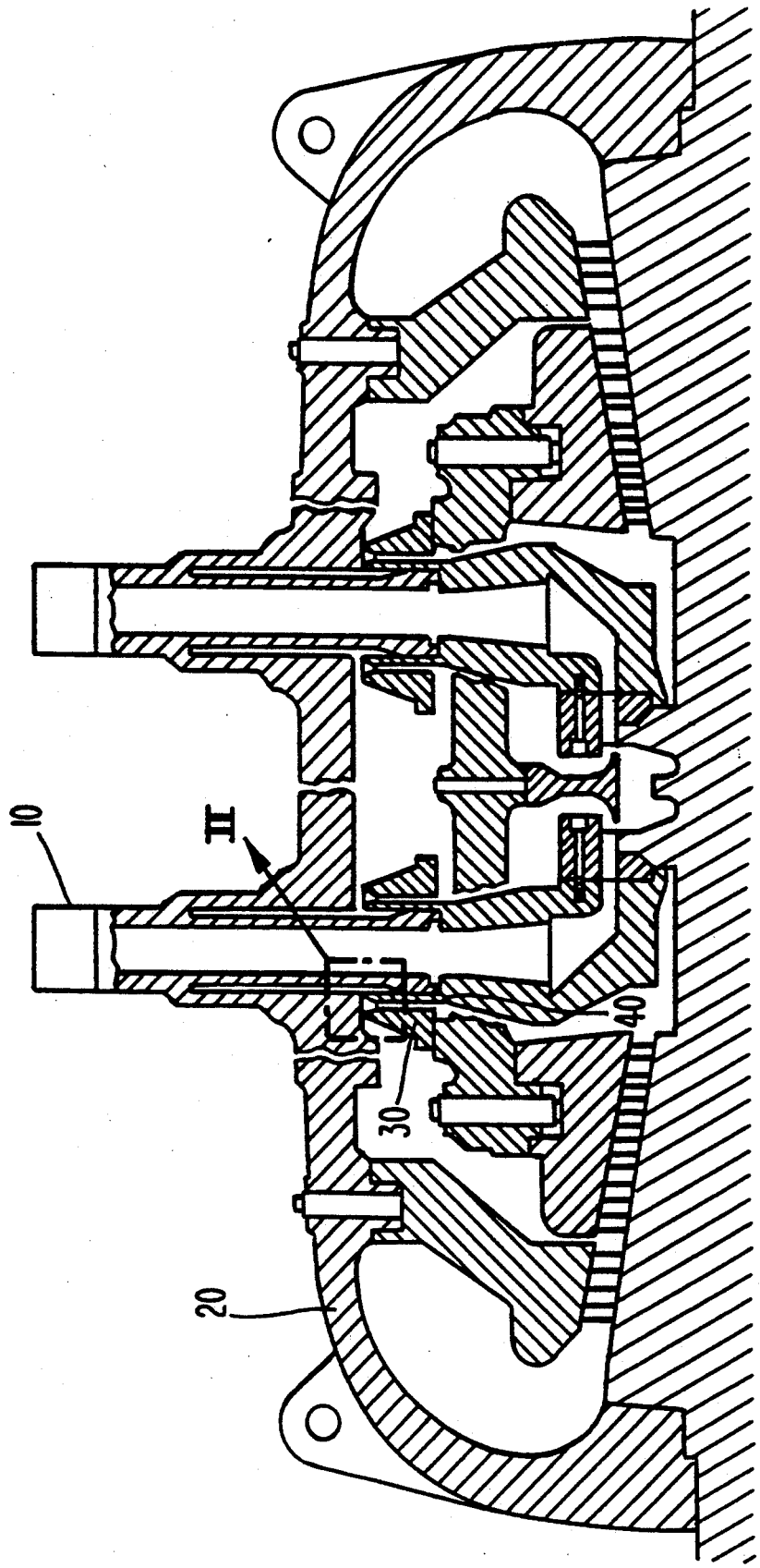
FIG. 1 is a partial cross-section of a portion of a steam turbine.

Referring to FIG. 1 there is shown a partial cross-section of a steam turbine. The upper half of the steam turbine, the area directly above the rotor centerline, is shown. The major components of the steam turbine relative to a description of the invention are the steam inlet 10, outer cylinder 20, inner cylinder 30, and nozzle chamber 40. During manufacture of the steam turbine, and occasionally during repair, a welding operation must be performed between the inner cylinder 30 and the nozzle chamber 40.

Figure 2:
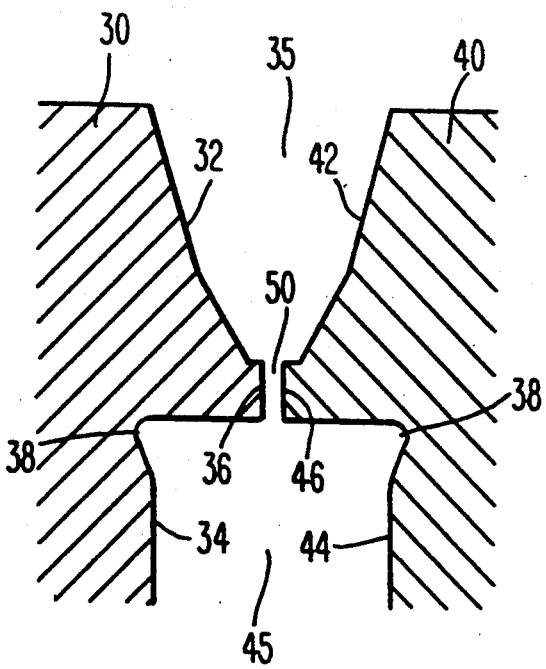
FIG. 2 is a partial cross-section of the area of the steam turbine in which the nozzle chamber and inner cylinder are in close proximity, defined by section II of FIG. 1.

An enlarged view (not to scale) of the area to be welded, denoted as area II in FIG. 1, is shown in FIG. 2. As can be seen from FIG. 2, the underside of the nozzle chamber 40 and inner cylinder 30 interface, herein referred to as the lower cavity 45 which is defined by cylinder lower surface 34 and nozzle lower surface 44, is a relatively long and narrow area. Typically the lower cavity 45 has a width of about 1.6 cm (0.6 in.), is cylindrical requiring a 360° weld, and has a depth of at least about 10.2 cm (4 in.). This area creates special problems for a welding operation. First, due to its relative inaccessibility, it is impractical to perform a weld to fill the gap 50 from the lower cavity 45 area. Second, upon welding from the upper side of the gap 50, defined by the cylinder upper surface 32 and the nozzle upper surface 42, and referred to as the upper cavity 35, base metal from the nozzle chamber 40 or the inner cylinder 30 and welding material can fall into the lower cavity 45. A third difficulty exists if the welding process must produce a uniform, substantially planar weld because during the welding process the base metal of the inner cylinder 30 and nozzle chamber 40 may sag while being exposed to the elevated temperatures of the welding process and the force of gravity. This sagging creates a nonuniform weld surface on the bottom of the weld, adjacent to the area where gap 50 meets lower cavity 45, which weld surface would contain stress concentration areas. This lower weld surface cannot be machine finished to a smooth, substantially planar surface due to its inaccessibility.

In accordance with the present invention, a welding process is performed by which a uniform, substantially planar weld can be accomplished in situations where the geometry of the structure to be welded presents some of the problems mentioned above. Referring to FIG. 3, and again referring to the steam turbine example, the structure is shown in a prepared state for welding.

The structure to be welded should first be fixed in a stationary position to insure that the structure does not move during the welding process. In many situations this may be an inherent characteristic of the structure. In the case of the steam turbine nozzle chamber/inner cylinder interface, steps must be taken to insure that the nozzle chamber interface 46 and the inner cylinder interface 36 are fixed in a position relative to one another.

The application of a refractory material 60 is then made into the lower cavity 45 proximate to the gap 50. Any available means may be utilized to apply the refractory material 60 into the lower cavity 45. For example, the refractory material 60 may be pumped into the lower cavity 45 or applied by the use of a tool which can fit into the lower cavity 45 and spread the refractory material 60 into place.

Typical refractory materials include ceramic fiber based mixes with densities in the range of from about 1 to about 1.5 g/cm$^3$ (from about 60–90 lbs./ft$^3$) when applied and have a dried density in the range of from about 0.2 to about 0.7 g/cm$^3$ (from about 15–45 lbs./ft$^3$). The refractory materials typically are silica based compounds with additives such as alumina, clays, and magnesium oxide. These materials can withstand temperatures up to about 1260° C. (2300° F.) and have a wet viscosity such that they can readily fill voids and cracks (such as the lower cavity 45) having effective cross-sectional areas as small as 0.04 cm$^2$ (0.06 in.$^2$). The viscosity characteristics of the refractory are such that the refractory material does not flow into the gap 50 when applied into the lower cavity 45. These refractory materials are commonly used in "lost wax" casting and molding processes. A typical refractory material is Plastix ® INJEC-TITE LWI 2300 available from Plibrico of Chicago, Ill. Refractory materials which are useful in the context of this invention are readily apparent to those skilled in the art and a complete list of such materials is unnecessary.

Figure 3:
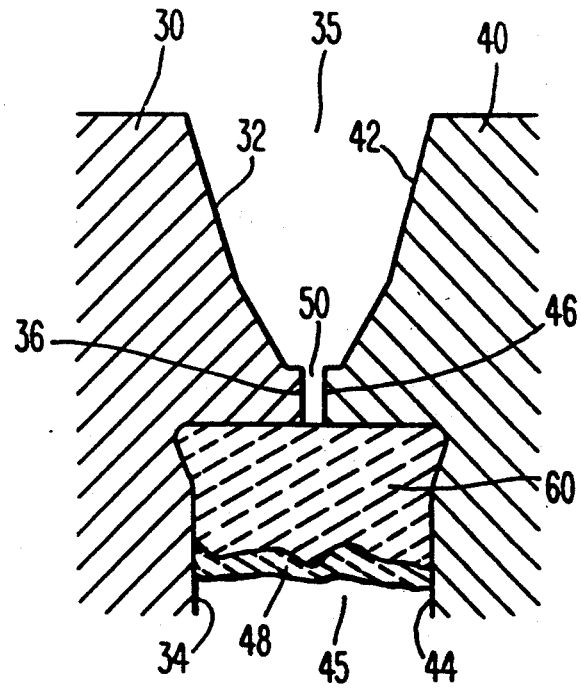
FIG. 3 is a cross-section of the nozzle chamber and inner cylinder interface with a refractory material in place prior to welding.

The refractory material 60 is allowed to harden before the welding process is commenced. A preferred application method for the refractory material 60 is to invert the nozzle chamber 40 and the inner cylinder 30 (or the particular structure being worked upon) so that the gravitational force aids in its placement adjacent to the gap 50. Upon the setting of the refractory material 60, the structure is returned to its normal position as shown in FIG. 3. Also, means may be employed to ensure that the refractory material remains in place during the subsequent welding process. Examples of such means include both the structural design of the welding area and the use of outside devices. An example of a structural design to aid in the retention of the refractory material 60 is the use of relieved surfaces 38, which are structural undercuts formed into the nozzle chamber 40 and inner cylinder 30. Examples of outside devices include the use of a screen or insulation material placed behind the refractory material 60 after that material is in place, as is shown by the retaining means 48.

Figure 4:
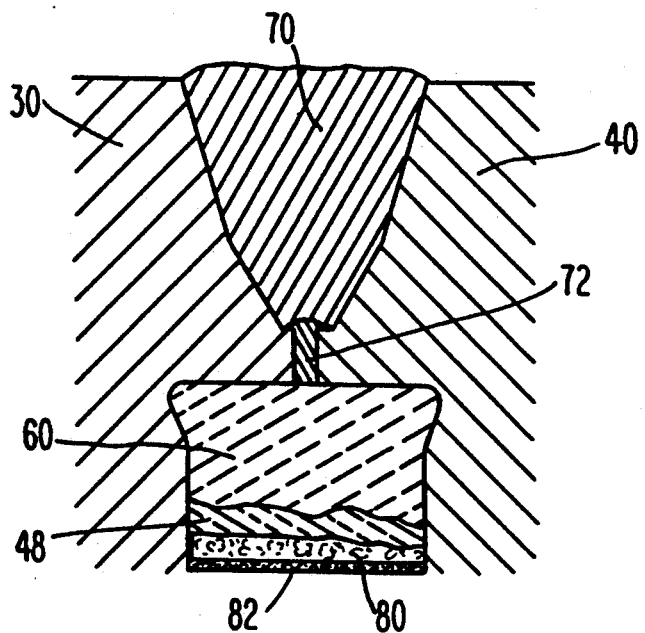
FIG. 4 is a cross-section of the nozzle chamber and inner cylinder interface after the welding process.

The next step in the process is the performance of the weld at the gap 50 surface. FIG. 4 shows the nozzle chamber 40 and inner cylinder 30 section of a steam turbine after the welding process is complete. Depending upon the width of the gap 50 the welded interface 72 may contain some welding material 70 along with the metal from the inner cylinder 30 and nozzle chamber 40 which was fused together during the welding process.

The welding process can be accomplished by employing any welding technique known in the industry. In the case of the steam turbine as shown in FIG. 4, where the nozzle chamber 40 and the inner cylinder 30 are made of a steel alloy containing up to about 3% by weight chromium and up to about 2% by weight molybdium, the weld is accomplished by a gas-tungsten arc welding, GTAW, technique with a guided welding wire made of a material similar to the steel alloy used for the nozzle chamber 40 and inner cylinder 30. A flux core welding process or other comparable welding process can be employed. Reference is also made to T. B. Jefferson and G. Woods, "Metals and How to Weld Them", James F. Lincoln Arc Welding Foundation, 2d Ed. (1983); and *Metals Handbook*, Vol. 6, "Welding, Brazing and Soldering", 9th Ed. ASM (1983), which are hereby incorporated by reference in their entirety. The welding process employed will be directly dependent upon the structure to be welded and the quality of the finished weld desired. When the weld is complete, the top surface of the welding material 70 is machine finished to provide a smooth, substantially planar surface.

The welding process may be completed in one pass or through a series of welding passes. In the nozzle chamber/inner cylinder system described herein, due to the requirement for a high quality finished weld, and due to the depth of the weld within the upper cavity 35, an initial "root" pass may be made. This root pass weld would be made to a depth of from about 0.16 cm (0.06 in.) to about 0.6 cm (0.25 in.) around the 360° perimeter of the gap 50. A second weld, or a plurality of subsequent welds, are then made on top of the initial root weld in order to fill the upper cavity 35 to a depth of about from 1.9 cm (0.75 in.) to about 3.8 cm (1.5 in.) or to the surface of the inner cylinder 30 and nozzle chamber 40. Alternatively, the entire weld can be accomplished on one welding pass.

It is preferred that the welding procedure include the use of an inert gas layer 80 behind the refractory material 60 within the lower cavity 45 as shown in FIG. 4. The inert gas can be sealed off by the use of a welding putty or sealant material which is used to form a seal 82. This inert gas layer 80 serves as a precaution during the welding process to ensure that the weld material does not react with the atmosphere during the welding process.

After the welding step is complete, the refractory material 60 is removed. If the inert gas layer 80 and seal 82 are used, they also are removed before the refractory material 60 is removed. The refractory material 60 can be removed by any process which can effectuate the removal. The use of a sharp edged and pointed steel tool can be gainfully employed for this procedure. The use of compressed air or other gas can be used to flush out the chipped away refractory material 60 from the lower cavity 45.

Although the above description has been directed to a nozzle chamber/inner cylinder surface to be welded, the principles disclosed herein are equally applicable to other structures involving similar weld geometries. Moreover, it is understood that although the above description has been directed to a preferred embodiment of the invention, other modifications and variations known to those skilled in the art may be made without departing from the spirit and scope of the invention as set forth in the appended claims.

I claim:

1. In a steam turbine having a nozzle chamber and an inner cylinder separated by a gap, the nozzle chamber and the inner cylinder both having an interface, an upper surface, and a lower surface, the respective surfaces defining an upper cavity and a lower cavity, a method of joining the nozzle chamber together to the inner cylinder characterized by the steps of:
   (a) fixing the nozzle chamber and the inner cylinder in a stationary position relative to one another;
   (b) applying a refractory material into the lower cavity and adjacent to the gap; and
   (c) welding the inner cylinder and nozzle chamber interfaces together at the gap from the direction of the upper cavity.

2. The method according to claim 1 wherein the refractory material is removed after the welding step.

3. The method according to claim 2 wherein the welding step comprises:
   (a) applying a first weld proximate to the gap, whereby the nozzle chamber and inner cylinder interfaces are fused together; and
   (b) subsequently applying at least one other weld proximate to the first weld in which a welding material fills a substantial portion of the upper cavity.

4. The method according to claim 2 wherein the nozzle chamber and inner cylinder are inverted during the applying step and reinverted prior to the welding step.

5. The method according to claim 2 wherein the applying step further comprises:
   injecting inert gas behind the refractory material and sealing off the gas with a sealant material.

6. The method according to claim 2 wherein the welding step comprises:
   (a) applying a first weld from about 0.16 cm (0.06 in.) to about 0.6 cm (0.25 in.) in depth adjacent to the gap; and
   (b) subsequently applying a second weld from about 1.9 cm (0.75 in.) to about 3.8 cm (1.5 in.) in depth adjacent to the first weld.

7. The method according to claim 2 wherein the welding step comprises a gas-tungsten arc welding process.

8. The method according to claim 2 wherein step (b) further includes the step of applying retaining means behind the refractory material in order to aid in holding the material in place.

9. In a steam turbine having a nozzle chamber and an inner cylinder separated by a gap, the nozzle chamber and the inner cylinder both having an interface, an upper surface, and a lower surface, the respective surfaces defining a first upper cavity and a second lower cavity, a method of joining the nozzle chamber together to the inner cylinder comprising the steps of:
   (a) fixing the nozzle chamber and the inner cylinder in a stationary position relative to one another;
   (b) inverting the inner cylinder and nozzle chamber so that the second cavity is above the first cavity and applying a refractory material into the second cavity and adjacent to the gap and returning the inner cylinder and nozzle chamber to their original position;
   (c) providing an inert gas behind the refractory material and sealing off the gas with a sealant within the second cavity;
   (d) welding the inner cylinder and nozzle chamber interfaces together at the gap from the direction of the first cavity; and
   (e) removing the refractory material.

10. The method according to claim 9 wherein the welding step comprises a gas-tungsten arc welding process.

11. The method according to claim 9 further comprising the step of machine finishing the top of the weld surface.

12. The method according to claim 9 wherein step (b) further includes, prior to returning the nozzle chamber and inner cylinder to their original position, applying retaining means behind the refractory material in order to aid in holding the material in place.

13. In a structure containing a gap, the structure being exposed on both sides of the gap, the structure having a confined area adjacent to one side of the gap, the confined area being inaccessible from a welding standpoint, a method for welding the gap comprising the steps of:
   (a) introducing a flowable refractory material into the confined area and adjacent to the gap, said flowable refractory material having a wet viscosity rendering it only capable of entering voids having a cross-sectional area larger than said gap;
   (b) allowing said refractory material to harden so as to form a barrier adjacent said gap capable of withstanding temperatures of up to 1260° C.; and
   (c) welding the other side of the structure in the area adjacent to the gap.

14. The method according to claim 13 wherein the refractory material is removed after the welding step.

15. The method according to claim 14 wherein the applying step further comprises:
   injecting inert gas behind the refractory material and sealing off the gas with a sealant material.

16. The method according to claim 14 wherein the confined area has a width of about 1.6 cm (0.6 in.).

17. The method according to claim 14 wherein the welding step comprises a gas-tungsten arc welding process.

18. The method according to claim 13 wherein step (a) further comprises the step of applying retaining means behind the refractory material in order to aid in holding the material in place.

* * * * *